(12) United States Patent
Rozman et al.

(10) Patent No.: US 7,746,024 B2
(45) Date of Patent: Jun. 29, 2010

(54) ELECTRIC ENGINE START SYSTEM WITH ACTIVE RECTIFIER

(75) Inventors: Gregory I. Rozman, Rockford, IL (US); Thomas A. Duclos, Suffield, CT (US)

(73) Assignee: Hamilton Sundstrand Corporation, Windor Locks, CT (US)

( * ) Notice: Subject to any disclaimer, the term of this patent is extended or adjusted under 35 U.S.C. 154(b) by 1145 days.

(21) Appl. No.: 11/369,676

(22) Filed: Mar. 7, 2006

(65) Prior Publication Data

US 2007/0216343 A1 Sep. 20, 2007

(51) Int. Cl.
H02P 3/18 (2006.01)
H02P 6/00 (2006.01)
H02P 23/00 (2006.01)

(52) U.S. Cl. ...................... 318/722; 318/811
(58) Field of Classification Search .................. 318/811, 318/599, 722, 762, 766, 799, 801
See application file for complete search history.

(56) References Cited

U.S. PATENT DOCUMENTS

| | | | |
|---|---|---|---|
| 5,218,520 A | 6/1993 | Rozman et al. | |
| 5,585,708 A * | 12/1996 | Richardson et al. | ......... 318/800 |
| 6,084,786 A | 7/2000 | Rozman | |
| 6,850,426 B2 | 2/2005 | Kojori et al. | |

\* cited by examiner

Primary Examiner—Bentsu Ro
Assistant Examiner—Erick Glass
(74) Attorney, Agent, or Firm—Kinney & Lange, P.A.

(57) ABSTRACT

A power converter includes a PWM active rectifier and controller that minimize harmonic ripple currents on the DC link during an engine start mode (first stage) in which power is provided to an AC starter motor. The PWM active rectifier and controller also minimize harmonic currents on AC input lines during a second stage (active filter mode). The power converter also includes a PWM inverter and corresponding inverter controller that controls the performance of the AC starter motor during the first stage based on mode selection input received. The power converter system further includes pre-charge circuitry that charges a DC link capacitor located within the power converter system to a desired level prior to providing the power converter system with AC power.

4 Claims, 6 Drawing Sheets

ELECTRIC ENGINE START SYSTEM WITH ACTIVE RECTIFIER

BACKGROUND OF THE INVENTION

The field of the invention relates generally to power converter systems for supplying power to a permanent magnet motor.

Commonly used in power generation systems, converters are devices that either convert alternating current (AC) power into direct current (DC) power (rectifier), or DC power to AC power (inverter). Whether a converter is being used as a rectifier or an inverter is dependent on the direction power is flowing through the converter. A typical power generation system may include a generator for producing AC power, an AC-DC converter (or rectifier), a DC link, a DC-AC converter (or inverter), and a load. The AC power generated by the generator is provided to the rectifier, which provides a rectified signal to the DC link. The inverter uses the rectified signal provided to the DC link to generate the desired AC power to the load. The quality of the AC power generated by the inverter is related to the quality of the DC power provided to the DC link. That is, by reducing fluctuations in current on the DC link, commonly referred to as ripple, the overall performance of the system is improved.

A typical method of reducing ripple on the DC link is to provide a capacitor or other filtering device between the rectifier and the inverter. The size of the capacitor or filter selected to reduce ripple is based on the amount of ripple that must be reduced. As ripple currents become large, the size of the capacitor becomes increasingly large and costly. Therefore, it would be desirable to design a system that reduces ripple current without the prohibitive cost of a large capacitor. Furthermore, the capacitor used to reduce ripple current between the rectifier and the inverter is often subject to high instantaneous currents at the initialization of the system, which adversely affects the performance of the capacitor. Therefore, it would also be desirable to design a system that would reduce exposure of the capacitor to high instantaneous currents.

The rectifiers discussed above can be generally classified as non-linear loads, since they may draw non-linear currents from the AC power source. A generator providing the AC power to the rectifier may also provide AC power to a number of other non-linear loads. Each of these non-linear loads contributes to generate harmonic currents on the AC input lines. A typical method of reducing the harmonic currents on the AC input lines is to include capacitive and inductive elements at the input of each non-linear load. Again, the size of the inductive and capacitive elements is related to the magnitude of the harmonics to be reduced. It would therefore be desirable to provide an economical solution to reducing the harmonic currents created on the AC input lines by non-linear loads.

BRIEF SUMMARY OF THE INVENTION

In one embodiment, the present invention relates to a system and method for controlling ripple within a converter, specifically on the DC link between an active rectifier and an inverter. In one aspect, an active rectifier controller minimizes ripple current by relating the DC link voltage to be generated by the active rectifier to the speed of an AC motor (permanent magnet or induction) being supplied with power by the converter. In another aspect, the active rectifier controller minimizes ripple current by employing harmonic compensators to determine the DC link voltage to be generated by the active rectifier. In another aspect, the active rectifier controller minimizes ripple current by synchronizing the switching frequency of the active rectifier based on the switching frequency employed the PWM inverter controller.

In another embodiment, a PWM inverter controller controls the power provided by the PWM inverter to the AC motor based on a selected mode of the PWM inverter controller. In each selected mode of operation, different inputs are used to effectuate the desired control of the AC motor. In one aspect of this system, the PWM inverter controller also provides for automatic field weakening control of the AC motor.

In another embodiment, pre-charge of a DC link capacitor located between the PWM rectifier and the PWM inverter is performed prior to initialization of the PWM rectifier. In one aspect of this invention, pre-charge of the DC link capacitor allows testing functions to be performed prior to power conversion applications.

In another embodiment of the present invention, when not employed in a power conversion capacity, the active rectifier is employed to minimize harmonics generated by other non-linear loads connected to an AC supply generator. The active rectifier controller, discussed above, controls PWM signals provided to the active rectifier such that the AC power on the AC input lines remains sinusoidal.

DETAILED DESCRIPTION

Figure 1:
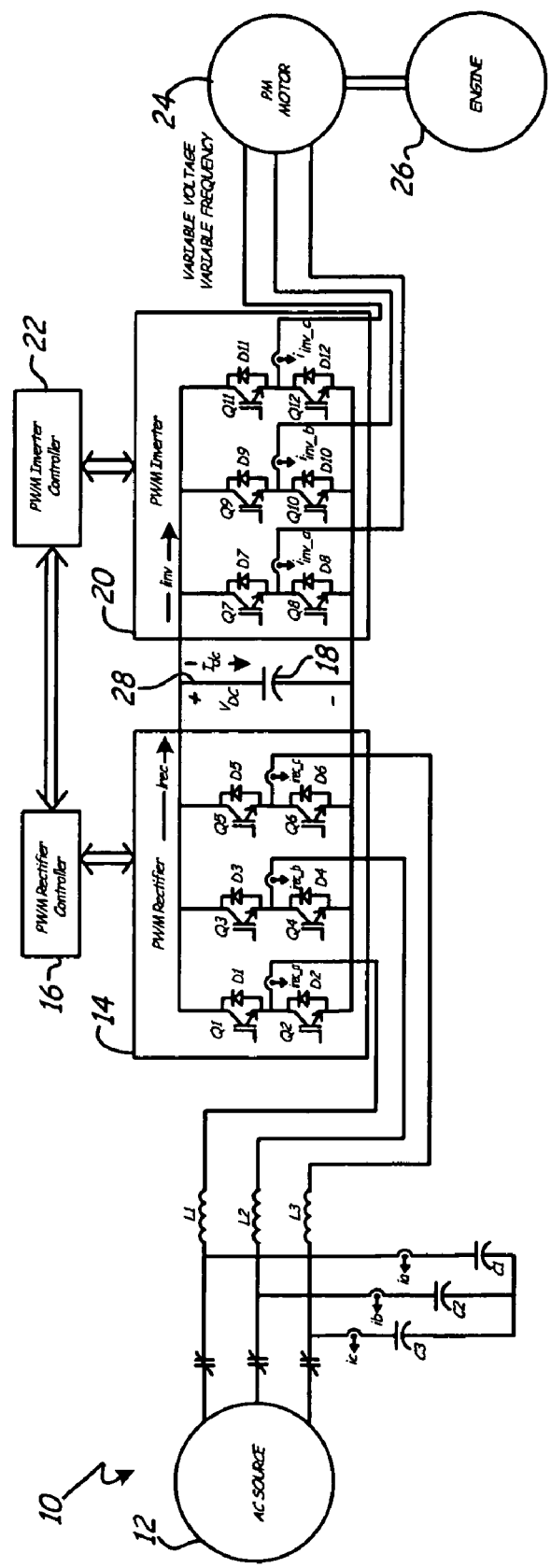
FIG. 1 is a topology of an electric engine start system.

Electric Engine Start System (FIG. 1)

FIG. 1 illustrates the fundamental components of electric engine start system 10. Electric engine start system 10 includes AC (alternating current) source 12, capacitors C1, C2, and C3, inductors L1, L2, and L3, pulse width modulated (PWM) rectifier 14, PWM rectifier controller 16, DC link capacitor 18, PWM inverter 20, PWM inverter controller 22, AC induction motor or permanent magnet (PM) motor 24, and engine 26.

During electric engine start applications, PWM rectifier 14 receives input AC power from AC power supply 12. Based on control signals provided by PWM rectifier controller 16, PWM rectifier 14 converts the AC power provided by AC power supply 12 to DC power, illustrated by DC rectifier current $I_{rec}$. DC link or DC bus 28 includes DC link capacitor 18, which is located between PWM rectifier 14 and PWM inverter 20. DC link capacitor 18 acts to reduce ripple currents generated by PWM inverter 20 and PWM rectifier 14. However, by selectively controlling PWM rectifier 14, the DC ripple generated on the DC bus can be automatically reduced, therefore reducing the size and cost of DC link capacitor 18.

The following equation illustrates the issue, wherein $I_{rec}$ represents the DC current generated by PWM rectifier 14, $I_{inv}$ represents the DC current required by PWM inverter 20, and $I_{dc}$ represents the current on DC bus 28 (i.e., the current through DC link capacitor 18). By minimizing the difference between the DC rectifier current $I_{rec}$ and the DC inverter current $I_{inv}$, the ripple current $I_{dc}$ generated on the DC bus is minimized.

$$I_{dc} = I_{rec} - I_{inv} \quad \text{EQ. 1}$$

PWM rectifier 14 is an active rectifier, containing power transistors Q1, Q2, Q3, Q4, Q5 and Q6, each power transistor having a gate, a collector and an emitter. Each of the power transistors Q1-Q6 has an associated fly back diode D1-D6, respectively, connected from emitter to collector. Power transistors Q1-Q6 are turned on and off (pulsed) by PWM rectifier controller 16 to selectively control the DC voltage $V_{dc}$ on DC bus 28, and therefore DC power generated by PWM rectifier 14. As discussed with respect to FIGS. 5 and 6, PWM rectifier 14 may also be used as an active filter when not being used as an active rectifier for electric engine start applications. Proper application of pulses to transistors Q1-Q6 by PWM rectifier controller 16 allows active rectifier 14 to minimize current ripple on the AC input lines (i.e. a reduction of ripple in measured currents $i_a$, $i_b$, and $i_c$).

PWM inverter 20 uses the DC voltage and current provided by PWM rectifier 14 to generate a variable voltage, variable frequency AC output voltage that is provided to PM motor 24. PWM inverter contains power transistors Q7, Q8, Q9, Q10, Q11 and Q12, each transistor having a gate, a collector and an emitter. Each of the transistors Q7-Q12 has an associated fly back diode D7, D8, D9, D10, D11, and D12, respectively, connected from emitter to collector. Power transistors Q7-Q12 are selectively turned on and off (pulsed) by PWM inverter controller 22. PWM pulses to transistors Q7-Q12 by PWM controller 22 control the three-phase power provided to PM motor 24. By controlling the amplitude and frequency of power provided to PM motor 24, PWM inverter controller 22 can control speed, position, and torque of PM motor 24.

Electrical energy provided to PM motor 24 is converted to mechanical energy that is provided to rotate or spin engine 26. For example, in aircraft engine applications, PM motor 24 must cause the engine turbine to spin at a sufficiently high speed in order to start the aircraft engine. Once engine 26 has been started, PM motor 24 no longer needs to provide engine 26 with power, and therefore may be disconnected (declutched) in the case of a permanent magnet motor, or de-excited, in the case of induction motor. As will be described in conjunction with FIGS. 5 and 6, components of the electric engine start system 10 may also be employed following engine start to reduce current harmonics caused by other non-linear loads attached to AC power supply 12.

Figure 2:
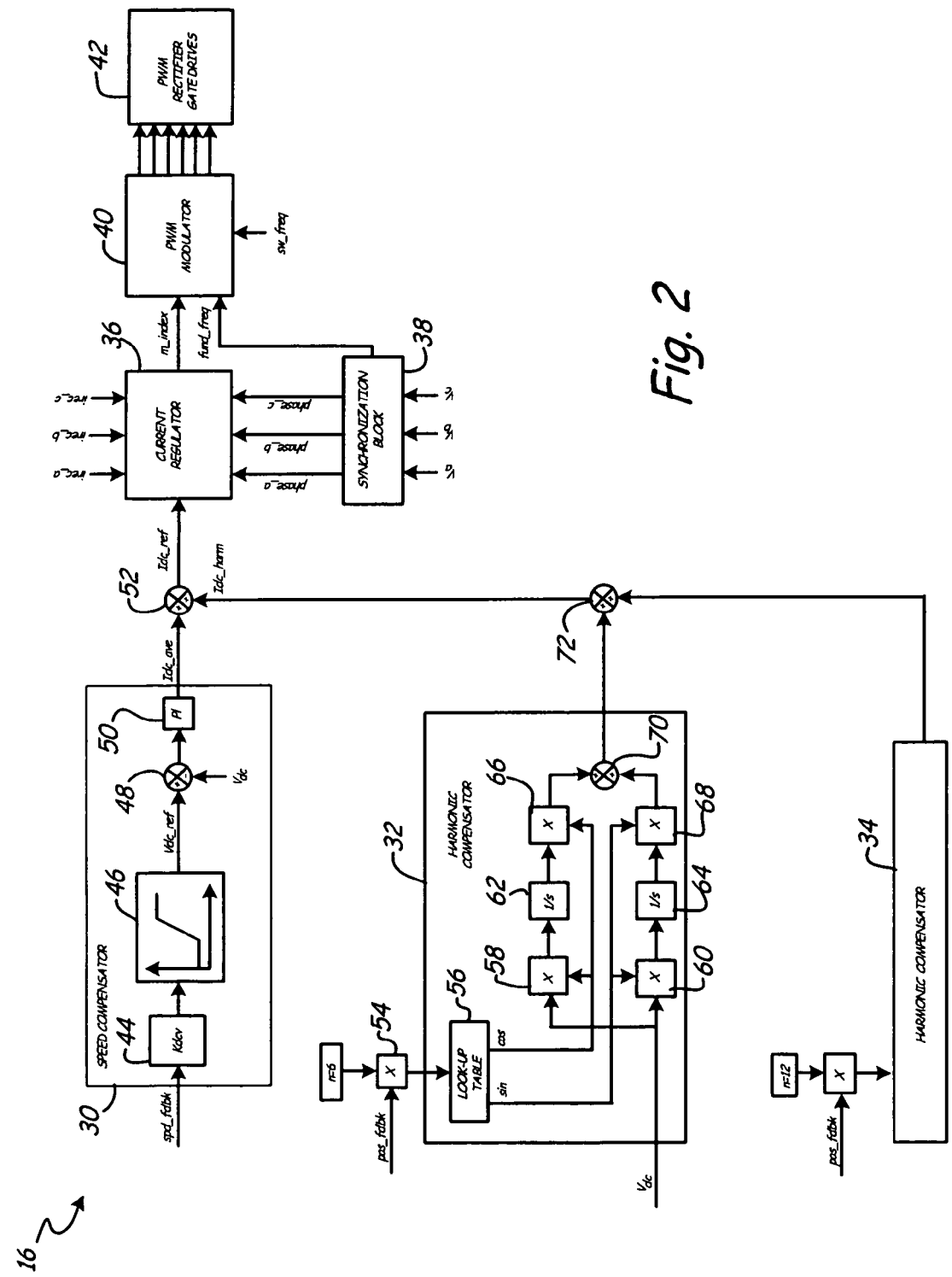
FIG. 2 is a block diagram of a control system for providing input signals to the active rectifier to effectuate control of the DC link capacitor voltage.

PWM Rectifier Controller (FIG. 2)

FIG. 2 is a functional block diagram of operations performed by PWM rectifier controller 16. PWM rectifier controller 16 includes a speed compensator block 30, harmonic compensator blocks 32 and 34, current regulator 36, synchronization block 38, PWM modulator block 40, and PWM rectifier gate drives 42. Based on input provided, PWM rectifier controller 16 determines the pulse width modulation signals to provide to power transistors Q1-Q6 (shown in FIG. 1), and therefore controls the voltage $V_{dc}$ and current $I_{rec}$ provided to DC link 28. Input provided to PWM rectifier controller 16 includes speed feedback (spd_fdbk), position feedback (pos_fdbk), DC link voltage $V_{dc}$, AC input voltages $v_a$, $v_b$, and $v_c$, AC rectifier input currents $i_{rec\_a}$, $i_{rec\_b}$, and $i_{rec\_c}$, and switching frequency (sw_freq).

Speed feedback and position feedback are estimations of speed and position, respectively, of PM motor 24. Speed feedback and position feedback may be derived using sensorless observation of PM motor 24 (based on measured current in PM motor 24), or may be measured using a sensor such as a resolver. DC link voltage $V_{dc}$ is derived by sensing the voltage across DC link capacitor 18. AC rectifier input currents $i_{rec\_a}$, $i_{rec\_b}$, and $i_{rec\_c}$ are measured within PWM rectifier 14, as shown in FIG. 1. Switching frequency is the frequency at which PWM inverter modulator (shown in FIG. 3) modulates power transistors Q7-Q12.

Speed compensator block 30 uses speed feedback to selectively increase or decrease the DC link voltage $V_{dc}$ provided at DC link 28. In general, as the speed of PM motor 24 increases, the back electromotive force (BEMF) generated by PM motor 24 also increases. In order to counteract the increased BEMF created by PM motor 24, the voltage made available to PWM inverter 20 (the DC link voltage $V_{dc}$) must be increased. Likewise, employing a low DC link voltage at initial start-up of PM motor 24 (i.e., low speeds) results in a higher modulation index M.

Speed feedback input provided to speed compensator block 30 is first multiplied by a constant gain $K_{dcv}$ at multiplier block 44, which is selected based on the design of PM motor 24. The output of multiplier 44 is provided to DC link reference calculator 46, which determines a DC link reference voltage $V_{dc\_ref}$ based on the multiplied speed feedback signal. The DC link voltage reference $V_{dc\_ref}$ provides the optimum DC link voltage $V_{dc}$ at the current speed of PM motor 18, within maximum and minimum limits. For instance, the DC link voltage reference $V_{dc\_ref}$ has a minimum value that is approximately 10-20% above the normal six-pulse passive rectification value. Because active rectification provides for higher DC link voltages than passive rectification, by setting the minimum value of DC link voltage reference $V_{dc\_ref}$ 10-20% above the passive rectification value, the active rectifier still provides unity power factor control and lower total harmonic distortion (THD) on input lines. A maximum DC link voltage reference is limited by safety margins taking into consideration the voltage ratings of power transistors Q1-Q6 and DC link capacitor 18.

The calculated DC link reference voltage $V_{dc\_ref}$ is provided to summer block 48 along with measured DC link voltage $V_{dc}$ (measured across DC link capacitor 18). Summer block 48, for example, may subtract the DC link voltage $V_{dc}$ from the DC link reference voltage $V_{dc\_ref}$ to generate a difference or error between the desired value and the current value. The difference between DC link reference voltage $V_{dc\_ref}$ and DC link voltage $V_{dc}$ is provided to proportional-integral (PI) controller 50. Based on the integrated error (as calculated by PI controller 50), an average DC rectifier current $I_{dc\_ave}$ is calculated. The average DC rectifier current $I_{dc\_ave}$ is combined or added with the calculated DC harmonic current $I_{dc\_harm}$ (discussed below) to generate a DC rectifier reference current $I_{dc\_ref}$, which is supplied to current regulator 36.

Based on position feedback provided with respect to PM motor 24, harmonic compensators 32 and 34 generate the DC harmonic current $I_{dc\_harm}$ that acts to offset harmonic distortion caused by current drawn from PWM inverter 20 (as shown in FIG. 1). Harmonics created by PWM inverter 20 at DC link 28 are typically multiples of six times the fundamental frequency of PWM inverter 20. As shown in FIG. 2, harmonic compensator 32 is directed towards the sixth harmonic (n=6) and harmonic compensator 34 is directed towards the twelfth harmonic (n=12). Only two harmonic compensators are shown in FIG. 2, although more could be added to eliminate further harmonics created at DC link 28. Harmonic compensators 32 and 34 operate in the same manner, therefore only harmonic compensator 32 is described in detail.

Position feedback (pos_fdbk) is a saw-toothed signal that, taken over time, provides information regarding the frequency of PM motor 24. Position feedback is multiplied by the harmonic multiple (in this case six) to be canceled at multiplier block 54. The output of multiplier block 54 provides the frequency of the harmonic to be canceled to look-up table 56, which converts the sawtooth input provided by multiplier block 54 to a sinusoidal signal, represented by a sine component and a cosine component. The respective sine and cosine components are multiplied by the DC link capacitor voltage $V_{dc}$ at multiplier blocks 58 and 60, respectively. Multiplying the DC link voltage $V_{dc}$ by the sine and cosine representation of the harmonic to be canceled acts as a filter to remove other harmonics not associated with the harmonic to be canceled (in this case the sixth harmonic). Therefore, if a sixth harmonic component exists within DC link voltage $V_{dc}$, the output of the multiplier blocks 58 and 60 will provide a representation of the sixth harmonic within the DC link voltage $V_{dc}$. The outputs of multiplier blocks 58 and 60 are next provided to integrator blocks 62 and 64, respectively. Integrator blocks 62 and 64 invert the sine and cosine signals, respectively, providing the opposite signals for outputs. The outputs of integrator blocks 62 and 64 provide a sinusoidal representation of the signals that will offset the sixth harmonic located within DC link voltage $V_{dc}$. The output of integrator blocks 62 and 64 are then provided to multiplier blocks 66 and 68, respectively. Multiplier blocks 66 and 68 multiplies the output of integrator blocks 62 and 64 by the sine and cosine signals provided by look-up table 56 to generate a DC reference current signal required to cancel the sixth harmonic from DC link voltage $V_{dc}$. The outputs of multiplier blocks 66 and 68 are added together at block 70 to generate the complete sixth harmonic cancellation reference current, which is combined with the complete twelfth harmonic cancellation reference current at block 72 to generate the DC harmonic reference current $I_{dc\_harm}$.

The DC harmonic reference current $I_{dc\_harm}$ represents the current component that will offset or cancel ripple currents existing at DC link 28 (in this case, the sixth and twelfth harmonics). The harmonic reference current $I_{dc\_harm}$ is combined with the average DC rectifier current $I_{dc\_ave}$ at block 52 to generate DC reference current $I_{dc\_ref}$ which is provided to current regulator 36. DC reference current $I_{dc\_ref}$ represents the current that needs to be generated by PWM rectifier 14, taking into account speed of PM motor 24 and harmonics generated by PWM inverter 20. That is, DC reference current $I_{dc\_ref}$ represents the desired dc rectifier current $I_{rec}$ (as shown in FIG. 1).

Current regulator 36 receives additional input from synchronization block 38, as well as current feedback input with respect to AC rectifier currents $i_{rec\_a}$, $i_{rec\_b}$, and $i_{rec\_c}$, as shown in FIG. 1. Based on these inputs, current regulator 36 determines the modulation index that is required to achieve the desired voltage and current at DC link 28. PWM modulator 40, based in part on the provided modulation index (m_index), determines the pulse width modulated signal to be provided to power transistors Q1-Q6 within active PWM rectifier 14. These signals are provided to PWM rectifier gate drives 42, which generate the required PWM signals and deliver them to power transistors Q1-Q6.

Synchronization block 38 receives as input grid voltages $v_a$, $v_b$, and $v_c$. Based on the supplied inputs, synchronization block 38 provides current regulator block 36 with template information representing the respective phases phase_a, phase_b, and phase_c of AC input voltages $v_a$, $v_b$, and $v_c$, respectively. The template signals are multiplied within current regulator 36 by DC reference current $I_{dc\_ref}$ signal to form instantaneous current references. Synchronization block 38 also provides fundamental frequency (fund_freq) information, representing the frequency of AC power supply 12, to PWM modulator 40. As discussed above, current regulator 36 calculates a modulation index (m_index) based on the DC reference current $i_{dc\_ref}$, AC rectifier currents $i_{rec\_a}$, $i_{rec\_b}$, and $i_{rec\_c}$, and phase input provided with respect to grid voltages $v_a$, $v_b$, and $v_c$. Based on the provided modulation index, fundamental frequency, and switching frequency, PWM modulator determines the pulse width modulation signals to provide to the gates of power transistors Q1-Q6. The switching frequency sw_freq represents the frequency at which PWM inverter controller 22 (discussed with respect to FIG. 3) switches transistors Q7-Q12 in PWM inverter 20. By synchronizing the PWM signals provided to PWM rectifier 14 with the PWM signals provided to PWM inverter 20, the harmonic ripple generated by PMW inverter 20 on DC link 28 is reduced.

Therefore, PWM rectifier controller 16 acts to minimize ripple current generated on DC link 28. Methods employed to minimize the ripple current includes adjusting the voltage and current generated at DC link 28 based on the speed of PM motor 24 using speed compensation block 30; employing harmonic compensators to cancel harmonics generated by PWM inverter 20; and synchronizing the switching frequency of pulses provided to PWM rectifier 14 with the frequency of pulses provided to PWM inverter 20.

Figure 3:
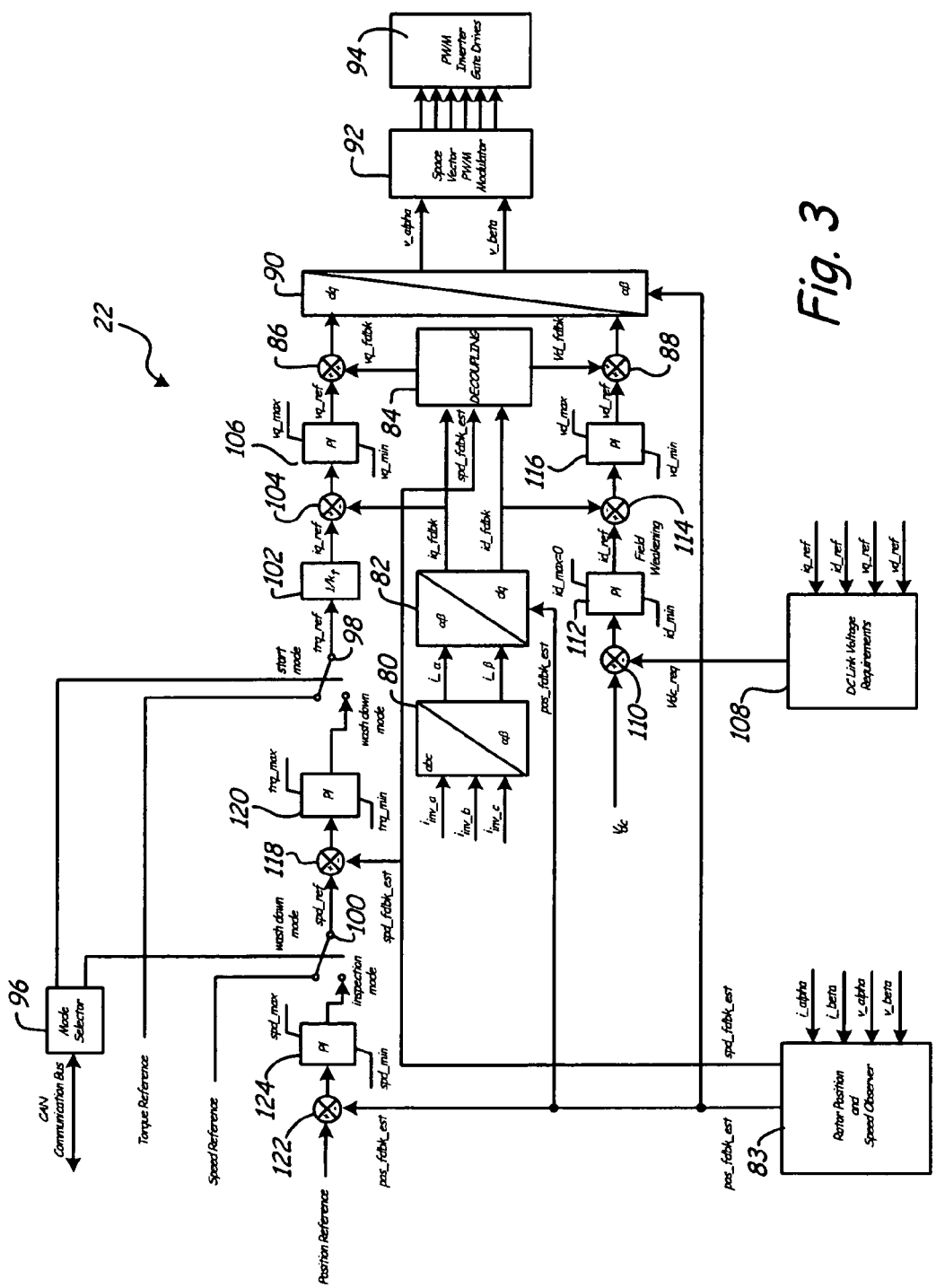
FIG. 3 is a block diagram of a motor control system for providing input signal to the inverter to effectuate motor control.

PWM Inverter Controller (FIG. 3)

FIG. 3 is a functional block diagram illustrating the operations performed by PWM inverter controller 22 to provide pulse width modulation (PWM) signals to power transistors Q7-Q12 of PWM inverter 20. PWM inverter controller 22 shown in FIG. 3 employs field oriented control (FOC) to effectuate efficient control of PM motor 24. Furthermore, PWM inverter controller 22 provides a mode selector feature that allows a user to control the mode of operation of PM motor 24. Depending on the mode selected by the user, different control mechanisms and inputs are employed by PWM inverter controller 22. Inputs provided to PWM inverter controller 22 include torque reference (trq_ref), speed reference (spd_ref), position reference (pos_ref), DC link voltage $V_{dc}$, and inverter currents $i_{inv\_a}$, $i_{inv\_b}$, and $i_{inv\_c}$. Torque reference, speed reference and position reference represent the values that PWM inverter controller 22 will act to generate or maintain within PM motor 24. For instance, if speed reference requests PM motor 24 spin at 2000 revolutions per minute (rpm) in a wash-down mode, then PWM inverter controller 22 will calculate and provide pulses to PMW inverter 20 to cause PM motor 24 to spin at 2000 rpm.

Field oriented control (FOC) requires currents sensed in PM motor 24 (shown in FIG. 1 as currents $i_{inv\_a}$, $i_{inv\_b}$, and $i_{inv\_c}$) to be converted from a three-phase stationary reference frame to a two-phase stationary reference frame αβ. This operation is performed by abc/αβ transformation block 80, which generates current outputs $i_α$ and $i_β$. The two-phase stationary currents $i_α$ and $i_β$ are then converted by αβ/dq transformation block 82 to a two-phase synchronous rotating d-q reference frame using position feedback provided with respect to PM motor 24. The output of αβ/dq transformation block 82 is a quadrature feedback current $i_{q\_fdbk}$ and a direct feedback current $i_{d\_fdbk}$. The current speed and position of PM motor 24 is estimated by rotor position and speed observer block 83. In this embodiment, rotor position and speed observer block 83 uses feedback values provided in the two-axis stationary reference frame (i.e., alpha current $i_\alpha$, beta current $i_\beta$, alpha voltage $v_\alpha$, and beta voltage $v_\beta$) to estimate the position and speed of PM motor 24. The quadrature feedback current component $i_{q\_fdbk}$ represents the current that is generating torque in PM motor 24. As discussed below, controlling the direct current component $i_{d\_fdbk}$ allows the field within PM motor 24 to be selectively decreased, a process known as field weakening that allows PM or induction motor 24 to achieve higher operating speeds. The quadrature feedback current component $i_{q\_fdbk}$ and the direct feedback current component $i_{d\_fdbk}$ represent the present conditions within PM motor 24. These values are compared with quadrature reference current components $i_{q\_ref}$ and direct reference current components $i_{d\_ref}$ at blocks 104 and 114, respectively, to determine the signals to provide to the gates of PWM inverter 20 to achieve the desired control of PM motor 24.

After calculating the quadrature current component $i_{q\_fdbk}$ and the direct current component $i_{d\_fdbk}$, the components are decoupled by decoupling block 84 using speed feedback provided with respect to PM motor 24. Decoupling block 84 uses estimated speed feedback (calculated by rotor position and speed observer block 83) to isolate the quadrature voltage component $v_{q\_fdbk}$ from the direct voltage component $v_{d\_fdbk}$. The quadrature voltage component $v_{q\_fdbk}$ is added with the quadrature reference voltage $v_{q\_ref}$ at block 86, and the direct voltage component $v_{d\_fdbk}$ is added with the direct reference voltage $v_{d\_ref}$ at block 88. The outputs generated at blocks 86 and 88 are provided to dq/αβ transformation block 90, which converts quadrature voltage and direct voltage to the two-axis stationary αβ reference frame, generating outputs $v_\alpha$ and $v_\beta$. Space vector PWM modulator 92 converts the $v_\alpha$ and $v_\beta$ reference voltages to control signals to be provided to PWM inverter gate drives 94, which generates the signals that are provided to the gates of transistors Q7-Q12 within PWM inverter 20.

The above discussion described the field oriented control transformations employed by PWM inverter controller 22 in generating signals that are provided to PWM inverter gate drives 94. The following discussion focuses on the control operations performed by PWM inverter controller 22 in calculating the desired quadrature reference current $i_{q\_ref}$ and a direct reference current $i_{d\_ref}$. The first step in calculating the desired quadrature reference current $i_{q\_ref}$ and direct reference current $i_{d\_ref}$ is selecting a desired mode in which to operate PM motor 24.

A CAN communication bus communicates input provided by a user to mode selector block 96, which operates switches 98 and 100 to select the desired mode of operation of PM motor 24. As shown in FIG. 3, a user may select from three different modes, including inspection mode, start mode, and wash down mode. Operations performed by PWM inverter controller 22 are selected based on the mode of operation selected. For instance, if start mode is selected, PWM inverter operates to maximize the torque generated in motor 24 in order to drive engine 26 to a light-off speed. In wash-down mode, the engine operates at a desirable speed. In inspection mode the required speed of the motor is very small (e.g., approximately one revolution per minute). Based on mode instructions received from the CAN communication bus, mode selector 96 connects switches 98 and 100 to select either start mode (switch 98 in the high position), wash down mode (switch 98 in the low position and switch 100 in the high position), or inspection mode (switch 98 in the low position and switch 100 in the low position).

If a user selects start mode, then PWM inverter controller 22 provides torque reference (trq_ref) to multiplier block 102 through switch 98. Torque reference represents the desired torque to be generated within PM motor 24. Multiplier block 102 divides the torque reference by a constant $K_t$ to generate a quadrature reference current $i_{q\_ref}$ which represents the quadrature current required to generate the desired torque. Summer block 104 compares the quadrature reference current $i_{q\_ref}$ with the quadrature feedback current $i_{q\_fdbk}$ (representing the present quadrature current in PM motor 24) to determine the difference or error between the two. The difference between the quadrature reference current $i_{q\_ref}$ and the quadrature feedback current $i_{q\_fdbk}$ is provided to proportional-integral (PI) control 106, which provides a quadrature reference voltage $v_{q\_ref}$ representing the voltage required to bring the quadrature feedback current $i_{q\_fdbk}$ in line with the quadrature reference current $i_{q\_ref}$. The quadrature reference voltage $v_{q\_ref}$ is summed with quadrature feedback voltage $v_{q\_fdbk}$ provided by decoupler block 86, and the output is provided to dq/αβ transformation block 90 as discussed above. Thus, in the start mode, PWM inverter controller 22 controls the gates of PWM inverter 20 based on the desired quadrature voltage, which in turn generates the required quadrature current necessary to generate the desired torque in PM motor 24.

Although the quadrature current is responsible for generating torque in PM motor 24, control of the direct current component through PM motor 24 during the start mode allows for PM motor 24 to attain higher speeds. In the embodiment utilizing a PM motor, the direct current component is set to zero. However, as discussed earlier, by controlling the direct current component $i_d$ through PM motor 24, the back electromotive force or field can be reduced, allowing PM motor 24 to reach higher speeds. This process is known as field weakening, and is typically implemented using a look-up table based on the speed of the PM motor.

PWM inverter controller 22 provides field-weakening automatically based on DC link voltage $V_{dc}$ and DC link voltage requirements $V_{dc\_req}$. DC link voltage requirement $V_{dc\_req}$ is determined based on reference values (i.e., values required to achieve desired PM motor performance) including quadrature reference current $i_{q\_ref}$, direct reference current $i_{d\_ref}$, quadrature reference voltage $v_{q\_ref}$, and direct reference voltage $V_{d\_ref}$. These values provide DC link voltage requirement block 108 with information regarding the power to be drawn from DC link 28 to achieve the desired motor performance. The output of DC link voltage requirement block 108 is DC link voltage requirement $V_{dc\_req}$, which is compared with the present DC link voltage $V_{dc}$ at summer block 110. The difference between the DC link voltage $V_{dc}$ and the DC link voltage requirement $V_{dc\_req}$ is provided to PI block 112. If no field weakening is required, then direct reference current (provided by PI block 112) will equal zero. As the desired speed of PM motor 24 increases, the direct reference current $i_{d\_ref}$ will decrease to a minimum value, providing field weakening that allows PM motor 24 to operate at higher speeds. The direct reference current $i_{d\_ref}$ is compared with direct feedback current component $i_{d\_fdbk}$ at summer block 114. The error or difference generated by summer block 114 is provided to PI block 116 to calculate the direct reference voltage $V_{d\_ref}$. Direct voltage feedback $v_{d\_fdbk}$ provided by decoupling block 84 is summed with the direct reference voltage $V_{d\_ref}$ at block 88, the output being provided to dq/αβ transformation block 90 as discussed above. Thus, the present invention provides for automatic field weakening based on the desired (quadrature and direct) currents and voltages being generated and the DC link voltage $V_{dc}$.

If mode selector 96 selects the wash-down mode by placing switch 98 in the lower position and switch 100 in the upper position, then speed reference (spd_ref) is used to determine the necessary torque to be generated in PM motor 24. Therefore, the desired speed of PM motor 24, as indicated by the speed reference is provided to summer 118. The current speed of PM motor 24 is estimated by rotor position and speed observer block 83. The estimated speed (spd_fdbk_est) is compared to the speed reference value by summer block 118. The resulting difference or error provided by summer block 118 is provided to PI block 120, which determines the required torque (trq_ref), within defined maximum and minimum values necessary to achieve the desired speed. The torque reference value is provided to multiplier block 102, and computations continue as discussed above with respect to the start mode. The following operations, as discussed above, generate the currents and voltages (and ultimately modulation pulses) required to generate the required speed in PM motor 24.

If mode selector 96 selects the inspection mode, in which position of the rotor is most important, then both switches 98 and 100 are placed in the lower position and the desired position of the rotor (expressed as position reference pos_ref) is used as an input to control PM motor 24. The position reference input is compared with the estimated position of PM motor 24 (shown as pos_fdbk_est) at summer block 122. The estimated position of PM motor 24 is calculated by rotor position and speed observer block 83 as discussed above with respect to estimated speed of PM motor 24. The difference or error generated by summer block 122 between the position reference and the present position, expressed as position feedback (pos_fdbk_est), is provided to PI block 124, which determines the desired speed or speed reference (spd_ref). After determining the speed reference required to place PM motor 24 in the desired position, the PWM inverter controller 22 operates as discussed above with respect to the wash-down mode.

Figure 4:
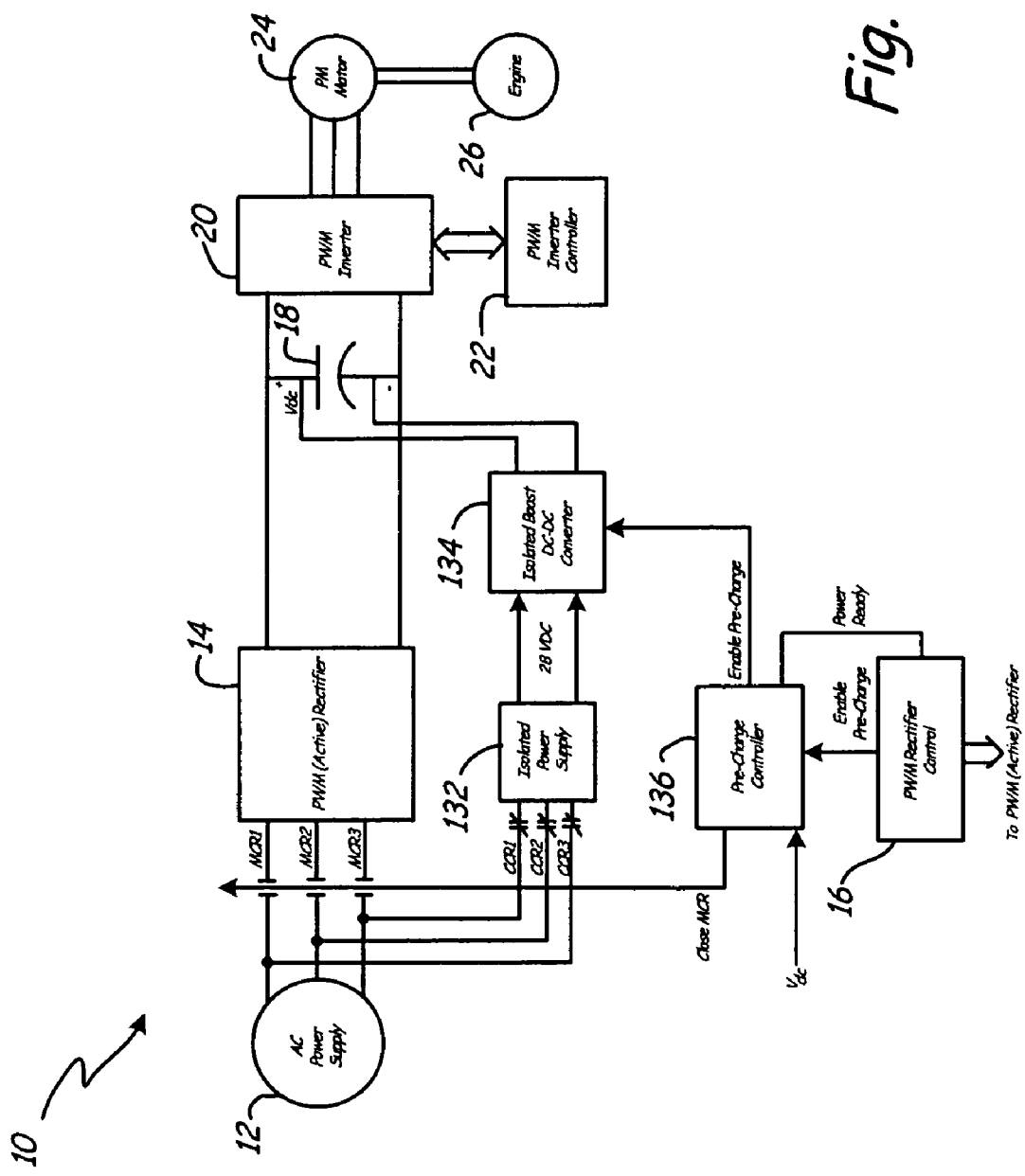
FIG. 4 is a block diagram of an electric engine start system including a DC link capacitor pre-charge system.

Pre-Charge of DC Link Capacitor (FIG. 4)

FIG. 4 shows a configuration of electric engine start system 10, in which DC link pre-charge circuitry is connected to provide an initial charge to DC link capacitor 18. Electric engine start system 10 includes AC power supply 12, PWM rectifier 14, PWM rectifier controller 16, DC link capacitor 18, PWM inverter 20, PWM inverter controller 22, PM motor 24, engine 26, isolated power supply 132, isolated boost DC-DC converter 134, and pre-charge controller 136.

In general, it is beneficial to charge DC link capacitor 18 prior to providing voltage from AC power supply 12 to PWM rectifier 14, and therefore to DC link capacitor 18. If DC link capacitor 18 is not charged prior to power being provided to PWM rectifier 14, DC link capacitor 18 provides a low impedance path that results in a high instantaneous current being generated through DC link capacitor 18. High instantaneous currents have an adverse effect on the performance and life of capacitors. Therefore, it is beneficial to charge DC link capacitor 18 prior to connecting PWM rectifier 14 to AC power supply 12. Isolated power supply 132, isolated boost DC-DC converter 134, and pre-charge controller 136 operate to provide the necessary charge to DC link capacitor 18 prior to AC source 12 providing power to PWM rectifier 14.

Pre-charge controller 136 controls the pre-charge operation. In response to input provided by active rectifier controller 16 enabling pre-charge, pre-charge controller 136 sends an enable pre-charge signal to isolated boost DC-DC converter 134. When enabled, DC-DC converter 134 converts DC input provided by isolated power supply 132 to a voltage sufficient to charge DC link capacitor 18 without generating large instantaneous currents through the capacitor. Isolated power supply 132 receives AC input from AC power supply 12, and converts the AC power to a DC value. Because voltage provided by active rectification is higher than the voltage provided by passive rectification, isolated boost DC-DC converter 134 must boost the DC input provided by isolated power supply 132 to a sufficiently high voltage to avoid damaging DC link capacitor 18 when power is connected to PWM rectifier 14.

As DC link capacitor 18 is charged, pre-charge controller 136 receives feedback regarding the voltage $V_{dc}$ across the capacitor. When the voltage $V_{dc}$ reaches a required level, pre-charge controller 136 provides a power ready signal to PWM rectifier controller 16. After completing the pre-charge function, pre-charge controller 136 closes main power contactors $MCR_1$, $MCR_2$, and $MCR_3$, connecting AC power supply 12 to PWM rectifier 14, at which time PWM rectifier 14 provides power to DC link capacitor 18.

Employing pre-charge controller 136 also allows field tests to be performed on components within electric engine start system 10 (e.g., PWM active rectifier controller 16 and PWM inverter controller 22) prior to connecting AC power supply 12 to PWM active rectifier 14. In order to conduct a proper field test of connected components, DC link capacitor 18 must be charged to a sufficiently high level. Verifying the operational status of connected components isolates problems before electric engine start operations are begun. After DC link capacitor 18 has been charged, and the operational status of components has been verified, AC power supply 12 is connected to PWM rectifier 14 and electric engine start operations are performed as described with respect to FIGS. 1-3 above. During electric engine start operations, isolated power supply 132 is electrically disconnected from AC power supply 12 by opening control power contactors $CCR_1$, $CCR_2$, and $CCR_3$.

Figure 5:
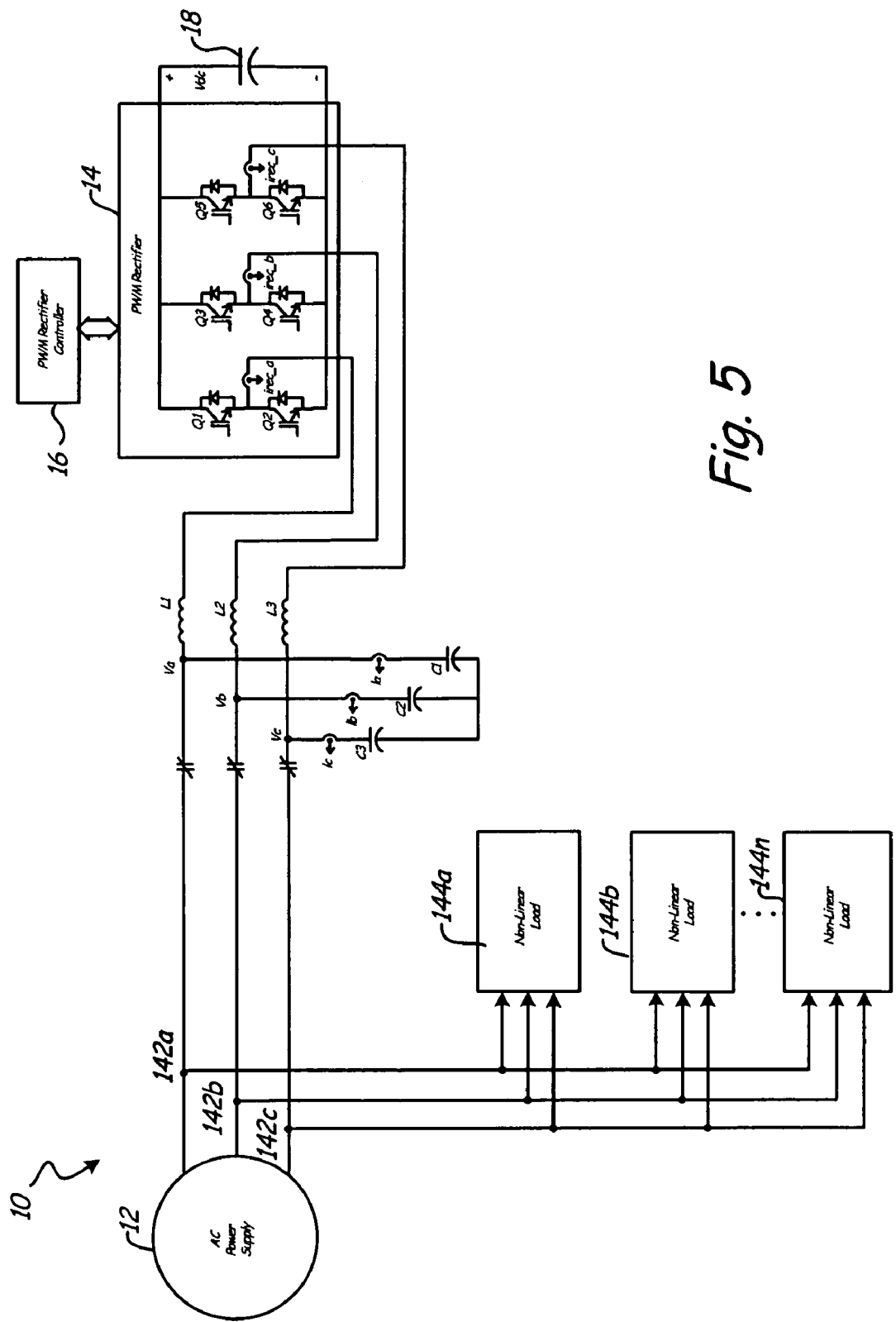
FIG. 5 is a block diagram of an electric engine start system for providing active filtering for non-linear loads.
Figure 6:
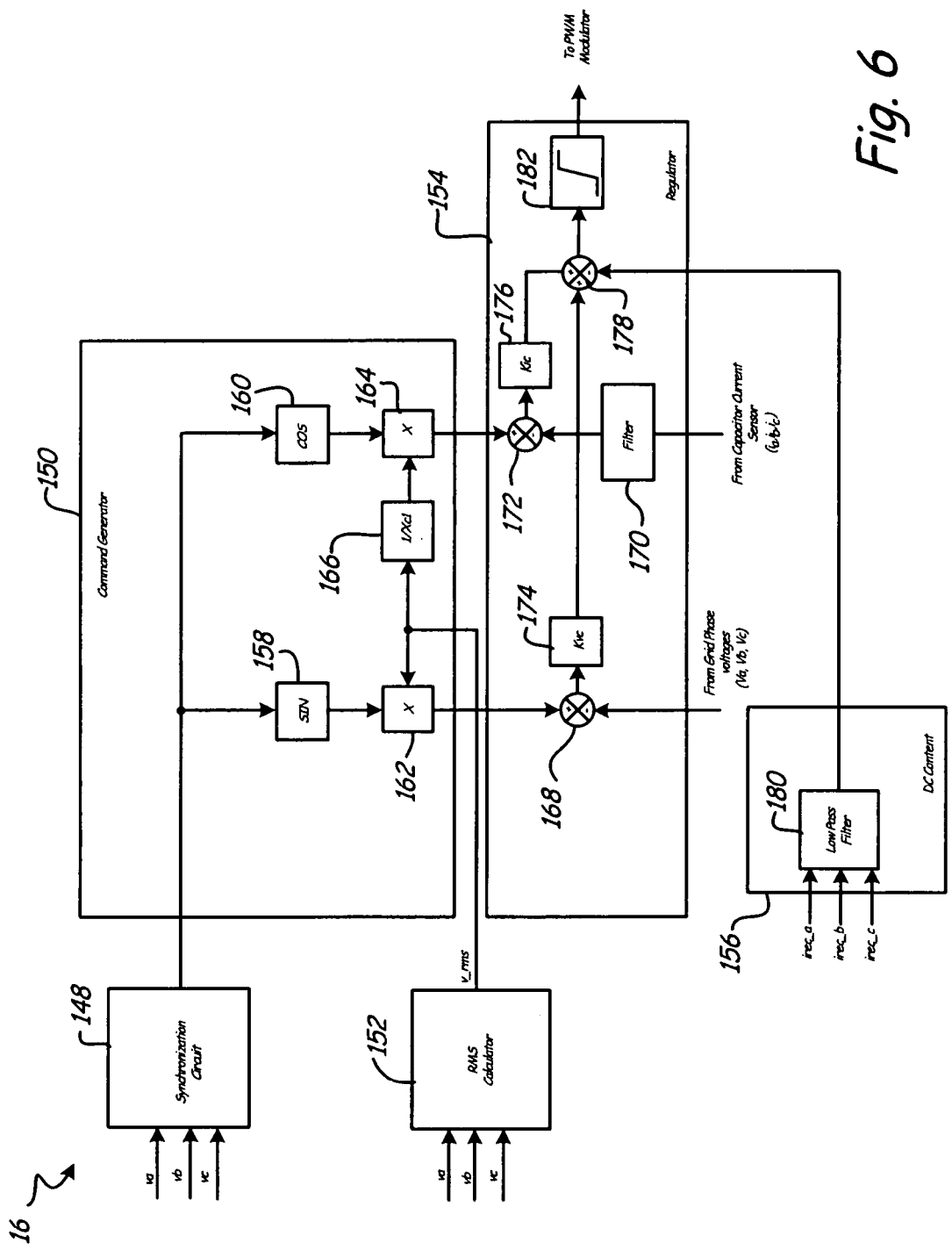
FIG. 6 is a block diagram of operations performed by a controller to provide active filtering of harmonics caused by non-linear loads on the grid bus.

Active Filtering by PWM Rectifier (FIGS. 5 and 6)

FIGS. 5 and 6 show an aspect of engine start system 10 that employs PWM rectifier 14 as an active filter following electric engine start of engine 26 (as shown in FIG. 1). Typically, an electrical engine start system is only used for a short time period during start-up of engine 26. Following a successful start-up of the engine, the electrical engine start system sits idle until the next engine start. In the embodiment shown in FIG. 5, PWM rectifier 14 is used following start-up of engine 26 (as discussed with respect to FIG. 1) to provide filtering of current harmonics on the AC input lines 142a, 142b and 142c due to the connection of a plurality of non-linear loads 144a, 144b ... 144N. In particular, PWM rectifier controller 16 can control PWM rectifier 14 to generate sinusoidal currents through capacitors C1, C2 and C3. If currents $i_a$, $i_b$, and $i_c$ (i.e., measured current through capacitors C1, C2, and C3) can be controlled to be sinusoidal, then the voltage (i.e., $v_a$, $v_b$, and $v_c$) across capacitors C1, C2, and C3 will also be sinusoidal. Generating sinusoidal voltages across capacitors C1, C2, and C3 results in automatic canceling of harmonics generated on AC bus input lines 142a, 142b, and 142c.

FIG. 6 is a functional block diagram of control operations performed by PWM rectifier controller 16 in controlling PWM rectifier 14 to minimize harmonic currents created on the AC bus lines 142a, 142b, and 142c. In one embodiment, PWM rectifier controller 16 performs the operations discussed with respect to FIG. 2 as well as the current operations. In other embodiments, the functions shown in FIG. 6 can be provided by circuitry separate from the PWM rectifier controller 16 shown in FIG. 2.

PWM rectifier controller 16 includes synchronization block 148, command generator block 150, RMS calculator 152, regulator 154, and DC content block 156. For the sake of simplicity, only a single phase is shown, although controlling all three phases would be accomplished in a similar manner.

PWM rectifier controller 16 receives as input AC voltages $v_a$, $v_b$, and $v_c$ (measured voltage across capacitors C1, C2 and C3, respectively), and AC currents $i_a$, $i_b$, and $i_c$ (measured current through capacitors C1, C2 and C3, respectively). AC voltages $v_a$, $v_b$, and $v_c$ are provided to synchronization circuit 148, which provides scaled phase information to command generator block 150. Command generator block 150 provides the scaled phase information (for instance, phase_a associated with grid voltage va) to sine block 158 and cosine block 160. The output of sine block 158 provides a sinusoidal reference voltage, whereas the output of cosine block 160 provides a sinusoidal reference current. The sinusoidal reference voltage and sinusoidal reference current generated by the sine and cosine blocks 158 and 160, respectively, provide the desired sinusoidal reference values that are to be maintained or generated by PWM rectifier 14.

The results of both the sine block 158 and the cosine block 160 are provided to multiplier blocks 162 and 164, respectively. Multiplier block 162 multiplies the output of sine block 158 with the RMS voltage associated with AC voltages $v_a$, $v_b$, and $v_c$ (in this example, AC voltage $v_a$) to provide the proper scale for the sinusoidal reference voltage. RMS voltage is calculated by RMS calculator 152 and provides an RMS value associated with each AC voltage $v_a$, $v_b$, and $v_c$. RMS voltage is also multiplied by the output of cosine block 160 at multiplier block 164. However, RMS voltage is first scaled by divider block 166, which converts the RMS voltage to an RMS current value. Multiplying by the RMS values provides sinusoidal reference voltages and currents of the proper scale, such that the sinusoidal reference voltages and currents can be compared with the present AC voltage values $v_a$, $v_b$ and $v_c$.

The scaled sinusoidal reference voltage and sinusoidal reference current are then provided to regulator 154, which compares the sinusoidal reference voltage to the AC grid voltage, in this case AC voltage $v_a$, at summer block 168. Likewise, the sinusoidal reference current, following filtering at filter block 170, is compared to the AC currents $i_a$ at summer block 172. The difference or error generated at summer blocks 168 and 172, representing the voltage or current values that must be generated by PWM rectifier 14, are provided to constant gain blocks 174 and 176, respectively. The output of constant gain blocks 174 and 176 are summed at block 178. The output of block 178 represents the power that must be provided by PWM rectifier 14 in order to reduce harmonics on AC input lines 142a, 142b, and 142c.

Low pass filter 180 takes as input AC currents $i_{rec\_a}$, $i_{rec\_b}$, and $i_{rec\_c}$, and provides an approximation of the inverter DC content. The DC content is subtracted from the output of constant gain blocks 174 and 176 at block 178. The output of block 178 is provided to PI block 182, which determines the reference voltage $V_{dc\_ref}$ that must be generated by PWM rectifier 14 in order to cancel the harmonics AC input lines 142a, 142b, and 142c, such that AC voltages $v_a$, $v_b$, and $v_c$ become sinusoidal. The results are provided to the PWM modulator.

Although the present invention has been described with reference to preferred embodiments, workers skilled in the art will recognize that changes may be made in form and detail without departing from the spirit and scope of the invention. In particular, the present invention has been described with respect to an electric engine start system, although the invention could be applied to any application that makes use of an active rectifier.

We claim:

1. An electric engine start system comprising:
    alternating current (AC) input lines for carrying AC power;
    a capacitor connected to each AC input line for measuring current and voltage on that AC input line;
    a pulse width modulation (PWM) rectifier connected to the AC input lines;
    a direct current (DC) link capacitor connected to the PWM rectifier;
    a PWM inverter connected to the DC link capacitor for converting DC power provided by the PWM rectifier to AC power provided to an AC motor;
    a PWM rectifier controller that controls the PWM rectifier to minimize harmonics at the DC link capacitor in a first mode in which power is provided to the AC motor, and controls the PWM rectifier to minimize harmonics on the AC input lines in a second non-motoring mode based on present voltage and current values measured on each of the AC input lines.

2. The electric engine start system of claim 1, wherein the PWM rectifier controller in the second mode controls the PWM rectifier such that sinusoidal voltages are generated across the capacitors located on each of the AC input lines.

3. The electric engine start system of claim 2, wherein the PWM rectifier controller generates a sinusoidal reference signal based on the voltage measured on the AC input lines and compares the sinusoidal reference signal with the present voltage measured on the corresponding AC input line to determine a correction required in the AC input line that will result in a sinusoidal signal being generated across the capacitors located on each of the AC input lines.

4. The electric engine start system of claim 1, further including:
    a PWM inverter controller connected to provide PWM signals to the PWM inverter to control the performance of the AC motor, wherein the PWM inverter controller includes a mode selector that dictates an input used by the PWM inverter controller in generating the PWM signals to provide to the PWM inverter.

* * * * *